Dec. 23, 1930.                R. W. FISHBACK                1,786,201
                              LOCKABLE BOLT NUT
                              Filed March 6, 1929
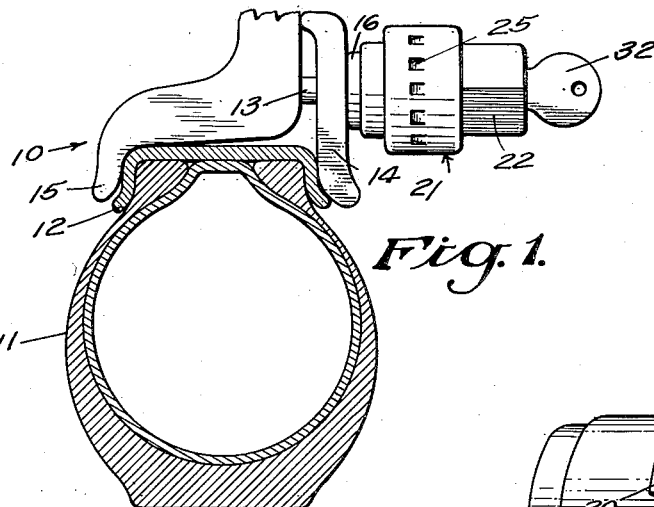
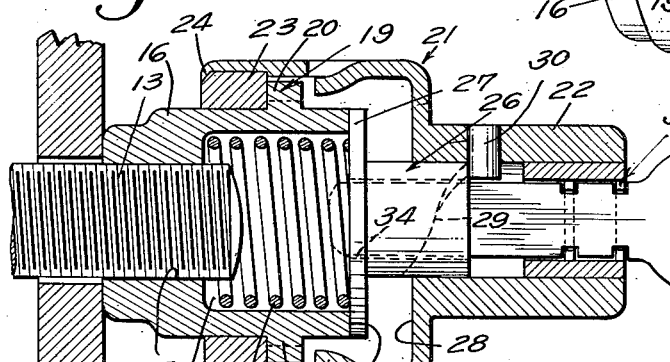
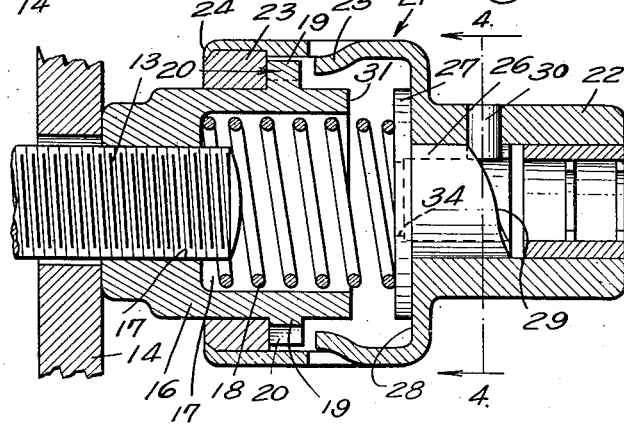
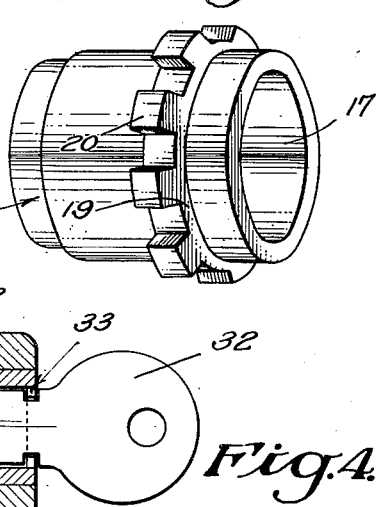
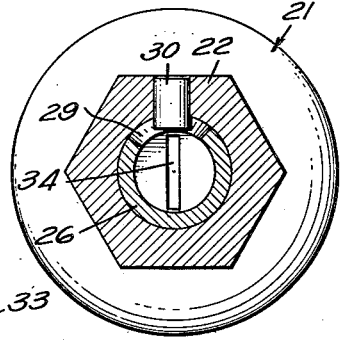
INVENTOR:
Robert W. Fishback,
By
ATTORNEY.

Patented Dec. 23, 1930

1,786,201

UNITED STATES PATENT OFFICE

ROBERT W. FISHBACK, OF LOS ANGELES, CALIFORNIA

LOCKABLE BOLT NUT

Application filed March 6, 1929. Serial No. 344,852.

This invention relates generally to theft-preventing devices, and is particularly directed to a type of such devices designed to prevent the unauthorized removal of a nut or like retaining element from an associated bolt or part.

It is the object of the present invention to provide a lockable retaining nut adapted for general application, and particularly serviceable for use as a locking means for retaining spare wheels or tires upon their mountings, which ordinarily form part of the standard equiment of automobiles.

A further object is to provide a device of the above character which includes a threaded member functioning as a retaining nut, and an operating member forming an enclosing housing for said threaded member, said operating member, being axially translatable from a position in which it is free to rotate upon said nut member, to a position in which it intermeshes with said nut member for unitary rotation therewith, and in which said operating member is provided with lock-operated means for preventing such translation.

Various other objects and advantages will be more fully apparent from the following description of the accompanying drawings, which form a part of this disclosure and which illustrate a preferred form of embodiment of the invention.

In the drawings,—

Fig. 1 is an elevation of the device illustrating its use as a means for retaining a spare-tire upon its support.

Fig. 2 is an enlarged axial section of the device as shown in Fig. 1.

Fig. 3 is a similar section showing the device unlocked to permit removal thereof.

Fig. 4 is a transverse section taken on the line 4—4 of Fig. 3.

Fig. 5 is a perspective view of the nut element.

In Fig. 1 there is illustrated a portion of a tire-rack or support 10 such as provided on many types of motor vehicles, and a portion of a conventional form of tire 11 and tire-rim 12. Such tire-racks are usually provided with a bolt or screw-threaded stud 13, and a retaining plate 14 is usually provided to engage over said stud and contact the rack and the tire-rim. When a nut is then screwed upon the outer end of the stud 13 tightly against the plate 14, the spare-tire is retained in place against the inner lip 15 of the rack, but with the use of an ordinary nut, the tire may be removed by an unauthorized person.

The device of the present invention is employed in place of the ordinary nut so as to prevent such unauthorized removal of the spare-tire, and, as shown, said device includes a cylindrical nut member 16 provided with an axial bore having a screw-threaded portion 17 and a counterbored portion 17a providing a spring chamber in which is seated a coil spring 18. A radial flange 19 is formed on the outer periphery of the nut member 16 near its outer end, and this flange is notched at circularly spaced intervals to provide clutch teeth 20.

An operating member 21 forms an enclosing housing for the outer portion of the nut member 16 and is provided with a hub portion 22 which is of hexagonal form in cross-section, adapting it for engagement by a wrench or other suitable tool.

In assembling this operating member 21 upon the nut member 16, it is slipped over the outer end of said nut member, and a retaining ring 23 is slipped over the inner end of said nut member and into the inner end of the operating member, after which the edge of said operating member 21 is crimped over the retaining ring 23, as indicated at 24. Thus, the operating member 21 is slidably mounted upon the nut member 16 and is retained thereon by the retaining ring 23 which engages the flange 19.

A series of clutch teeth 25 is formed on the inner periphery of the operating member 21 by punching tangs inwardly from the metal forming said operating member, and these clutch teeth are disposed to align with and engage between the clutch teeth 20 of the nut member 16 when the operating member 21 is pushed inwardly.

Mounted within the bore of the hub 22 of the operating member 21 is a lock mechanism consisting of a lock sleeve 26 which is rotatably and slidably mounted within the inner end of said bore. This lock sleeve 26 at its inner end is provided with a disc 27 which normally engages the front wall 28 of the operating member 21 and is engaged by the coil spring 18. The spring 18 thus normally exerts its tension to yieldingly maintain the two telescopically united members 16 and 21 extended with the clutch teeth 20 and 25 disengaged and the retaining ring 23 engaging the flange 19 of the nut member 16, as shown in Fig. 3.

The outer end of the lock sleeve 26 has a helical cam surface 29 engaging against a stationary abutment pin 30 which is mounted in the hub 22, so that upon rotation of said sleeve from the position shown in Fig. 3 to that shown in Fig. 2, the cam action of the helical surface 29 against the stationary pin 30 will effect an inward translation of the lock sleeve 26 until the disc 27 engages the outer edge 31 of the nut member 16, thus effectively locking the operating member 21 in normal idling position; that is, the lock sleeve in the position shown in Fig. 2 prevents any sliding inwardly of the operating member 21 upon the nut member 16, thus preventing coengagement of the companion clutch teeth 20 and 25.

The means utilized for rotating the lock sleeve 26 consists of a flat key 32 which may be inserted through a suitable baffle arrangement 33 mounted in the outer end of the bore of the hub 22, through the bore of the sleeve 26, and through a diametric slot 34 cut in the disc 27 which otherwise closes the inner end of the bore of the lock sleeve.

In the drawings, the helical cam surface 29 is so proportioned, and the key 32 is so notched for cooperation with the baffle arrangement 33, that the key 32 may be inserted and turned one-half of a revolution to operate the lock sleeve 26 and be then removed. However, it will be understood that by reforming the helical cam surface 29 and suitably changing the baffle arrangement 33 and the particular arrangement of notches in the key, as is well-known in the lock art, the lock sleeve 26 may be arranged to perform its intended function with less or more than one-half of a revolution.

In Fig. 3, the device is shown applied to a threaded stud 13 and is in normal idling condition; that is, the spring is exerting its tension to keep the operating member 21 extended and with its teeth 25 out of engagement with the teeth 20 of the nut member 16 so that the operating member 21 may be freely rotated upon the nut member 16.

If it is now desired to tighten or to remove the device, the space between the lock disc 27 and the outer edge 31 of the nut member 16 permits the operating member 21 to be slid inwardly upon the nut member 16 so as to intermesh the clutch teeth 25 with the clutch teeth 20 so as to interlock the two members for unitary rotation, this unitary rotation being accomplished by turning the operating member by means of a wrench or other suitable tool applied upon the hexagonal hub 22 thereof.

With the device in the normal condition shown in Fig. 3 the key 32 may be inserted and given a half turn in a clockwise direction, after which the key may be withdrawn. Thus turning of the inserted key will cause the lock sleeve 26 to be turned one-half of a revolution and the resulting cooperation of the helical cam surface 29 against the stationary pin 30 will effect an inward translation of the lock sleeve 26 against the tension of the spring 18 to bring the lock disc 27 into contact with the outer edge 31 of the nut member 16, and thus lock the operating member 21 against axial translation. The operating member 21 can in this condition be freely rotated, but will not turn the nut member 16, since the cooperating clutch teeth 20 and 25 will not be in coengagement.

From the above description it will be understood that in the present device the lock means is employed for preventing an operative connection between the operating member and the nut member and does not itself form the operating connection.

This is particularly advantageous since in this manner the lock mechanism is not subjected to operating strains and it is a distinction over those prior art devices in which the lock mechanism forms the actual operating connection.

While the specific embodiment herein illustrated and described is fully capable of fulfilling the objects primarily stated, it is to be understood that I do not wish the invention to be limited thereby for it is susceptible of embodiment in various other forms, all of which will come within the scope of the claims which follow.

I claim as my invention:

1. A device of the nature disclosed, comprising: a nut member; an operating member, said members having companion clutch means and said operating member being freely rotatable on said nut member and adapted for axial translation thereon to coengage said companion clutch means for unitary rotation of both members; and locking means for preventing such axial translation.

2. A device of the nature disclosed, comprising: a nut member; an operating member, said members having companion clutch means and said operating member being freely rotatable on said nut member and adapted for axial translation thereon to coengage said companion clutch means for unitary rotation of both members; and an abutment means positioned between said members and movable from a position permitting said translation to a position preventing such axial translation.

3. A device of the nature disclosed, comprising: a nut member; an operating member, said members having companion clutch means and said operating member being freely rotatable on said nut member and adapted for axial translation thereon to coengage said companion clutch means for unitary rotation of both members; tension means yieldingly maintaining said operating member against translation; and locking means for preventing such axial translation.

4. A device of the nature disclosed, comprising: a nut member; an operating member, said members having companion clutch means and said operating member being freely rotatable on said nut member and adapted for axial translation thereon to coengage said companion clutch means for unitary rotation of both members; tension means yieldingly maintaining said operating member against translation; and an abutment means positioned between said members and movable from a position permitting said translation to a position preventing such axial translation.

5. A device of the nature disclosed, comprising: a nut member; an operating member telescopically mounted thereon for axial translation from a normal extended position to a contracted position and for free rotation while in extended position, said members having companion clutch means normally disengaged and adapted for coengagement upon translation of said operating member to contracted position to lock said members together for unitary rotation; and locking means for preventing such translation of the operating member.

6. A device of the nature disclosed, comprising: a nut member; an operating member telescopically mounted thereon for axial translation from a normal extended position to a contracted position and for free rotation while in extended position, said members having companion clutch means normally disengaged and adapted for coengagement upon translation of said operating member to contracted position to lock said members together for unitary rotation; and an abutment means positioned between said members and movable from a position permitting said translation to a position preventing such translation of the operating member.

7. A device of the nature disclosed, comprising: a nut member; an operating member telescopically mounted thereon for axial translation from a normal extended position to a contracted position and for free rotation while in extended position, said members having companion clutch means normally disengaged and adapted for coengagement upon translation of said operating member to contracted position to lock said members together for unitary rotation; tension means yieldingly maintaining said operating member against translation; and locking means for preventing such translation of the operating member.

8. A device of the nature disclosed, comprising: a nut member; an operating member telescopically mounted thereon for axial translation from a normal extended position to a contracted position and for free rotation while in extended position, said members having companion clutch means normally disengaged and adapted for coengagement upon translation of said operating member to contracted position to lock said members together for unitary rotation; tension means yieldingly maintaining said operating member against translation; and an abutment means positioned between said members and movable from a position permitting said translation to a position preventing such translation of the operating member.

In testimony whereof, I have hereunto set my hand at Los Angeles, California, this 1st day of March, 1929.

ROBERT W. FISHBACK.